United States Patent [19] | [11] 4,424,449
O'Brill | [45] Jan. 3, 1984

[54] SHIELDED FLUORESCENT SIGNS

[76] Inventor: Robert A. O'Brill, 8116 Lorel, Skokie, Ill. 60076

[21] Appl. No.: 287,949

[22] Filed: Jul. 29, 1981

[51] Int. Cl.[3] ...................... G01N 21/64; G09F 13/20

[52] U.S. Cl. .................................... 250/461.1; 40/542

[58] Field of Search ............... 250/458.1, 461.1, 462.1, 250/483.1, 484.1; 40/542

[56] References Cited

U.S. PATENT DOCUMENTS 3,525,864 8/1970 Leach .............................. 250/461.1

4,016,450 4/1977 Balekjian .......................... 250/461.1

*Primary Examiner*—Janice A. Howell
*Attorney, Agent, or Firm*—Bernard L. Kleinke

[57] ABSTRACT

A sign includes fluorescent pigment-containing indicia protected from fading from solar ultraviolet radiation by a transparent, ultraviolet-absorbing shield spaced apart therefrom. An artificial source of ultraviolet radiation is interposed between the indicia and the shield, and permits excitation of the fluorescence for nighttime use of the sign.

10 Claims, 4 Drawing Figures

SHIELDED FLUORESCENT SIGNS

DESCRIPTION

1. Technical Field

This invention relates in general to signs, and it more particularly relates to outdoor signs having indicia, containing fluorescent pigments.

2. Background Art

Many outdoor signs are required to be highly visible and attention attracting in appearance. For example, at airports, taxiway/runway intersection signs are used to preclude inadvertent incursion of taxiing aircraft into an active runway or other critical area. Should such a sign not be conspicuously noticeable to a pilot in a taxiing aircraft, such aircraft could inadvertently enter an active runway, thus endangering other aircraft in the process of landing or taking off.

There are many distractions to the taxiing pilot who must concentrate on many different considerations. For example, the taxiing pilot must attend to radio-transmitted voice instructions from the air traffic control tower, must watch for other moving aircraft as well as ground support vehicles, and, of course, must be on the alert for taxiway guidance signs as well as edge and/or centerline lights associated with other taxiway and runways, which are not part of the pilot's itinerary. In addition to the outside signals, the pilot is required to follow the various cockpit indicators.

Additionally, it is not entirely an easy matter for a taxiing pilot to notice and to read taxiway guidance signs. Pilots in wide body aircraft are positioned at an elevation of approximately 30 feet above the pavement, and the indicia of such signs may be as small as 12 inches high. Thus, all of these difficulties associated with observing taxiway guidance signs, are compounded at nighttime and during low visibility conditions.

Highly conspicuous signs bearing daylight fluorescent indicia have been employed also on highways, store fronts and billboards, since they are clearly observable during daylight hours. However, they have not been entirely satisfactory, since the fluorescent pigments used on such signs fade badly in a short time, such as within a few months, in bright sunlight. Thus, a fluorescent sign requires repair or replacement at relatively short intervals, and the process is not only costly, but the deteriorating sign is not acceptable for use in critical areas, such as taxiways and runways at airports.

Therefore, it would be highly desirable to have a new and improved attention-attracting sign, which is highly visible and very conspicuous, and which can be used out of doors in all types of weather conditions, as well as low light and low visibility conditions. Such an attention-attracting sign should be relatively inexpensive to manufacture, and to maintain. Such a sign should be highly visible, and conspicuously attention attracting at long distances therefrom. For example, for airport usage, the Federal Aviation Administration specifications require that the background colors of taxiway guidance signs be readily discernible at nighttime up to a distance of 800 feet.

DISCLOSURE OF THE INVENTION

Therefore, the principal object of the present invention is to provide a sign, which is highly visible and conspicuously attention attracting at relatively great distances therefrom, and which can be used out of doors in all types of weather conditions and lighting conditions, including nighttime.

Another object of the present invention is to provide such a new and improved sign, which is relatively inexpensive to manufacture and to maintain.

Briefly, the above and further objects of the present invention are realized by providing a sign which has fluorescent pigment-containing indicia of brilliant, conspicuous colors during daylight hours. A shield is spaced in front of the indicia, and is composed of a material substantially transparent to visible radiation and substantially opaque to ultraviolet radiation to prevent, or at least to reduce greatly, the solar ultraviolet radiation impinging on the fluorescent indicia to prevent or at least reduce greatly, the fading thereof. A source of artificial utlraviolet radiation is interposed between the indicia and the shield so that radiation from the source impinges directly on the indicia without passing through the shield, to cause the indicia to fluoresce, and thus be highly conspicuous and clearly visible at low light and low visibility conditions, such as occur at nighttime and during inclement weather.

In one form of the invention, the shield is composed of transparent laminated glass having an ultraviolet-absorbing plastic interlay. In another form of the present invention, the shield is composed of acrylic plastic material containing an ultraviolet absorber.

According to one aspect of the present invention, at least a portion of the ultraviolet illumination if flashed on and off to provide a greater attention-attracting quality to the sign, and to make it even more conspicuous while the remaining illumination is steady to provide visual continuity of the signal.

The present invention is advantageously utilized in applications where a sign having long-lasting high visibility markings is required for outdoor, daytime and nighttime use. At nighttime, the highly visible sign, when illuminated, produces a dramatically vivid image to the eyes of a viewer. There is a high level of illumination produced without the glare and with very low power consumption. When used for designating airport runways, the sign of the present invention is highly conspicuous at daytime and nighttime, since it clearly and brilliantly stands out in the ambient light and also amongst all the other lights and signs competing for the attention of the pilot. Moreover, the black light illumination and the fluorescent glow it causes in the fluorescent indicia of the present invention, are relatively glare-free.

BRIEF DESCRIPTION OF THE DRAWINGS

The above mentioned and other objects and features of this invention and the manner of attaining them will become apparent, and the invention will be best understood by reference to the following description of embodiments of the invention taken in conjunction with the accompanying drawings, wherein.

BEST MODE OF CARRYING OUT THE INVENTION

Figure 1:
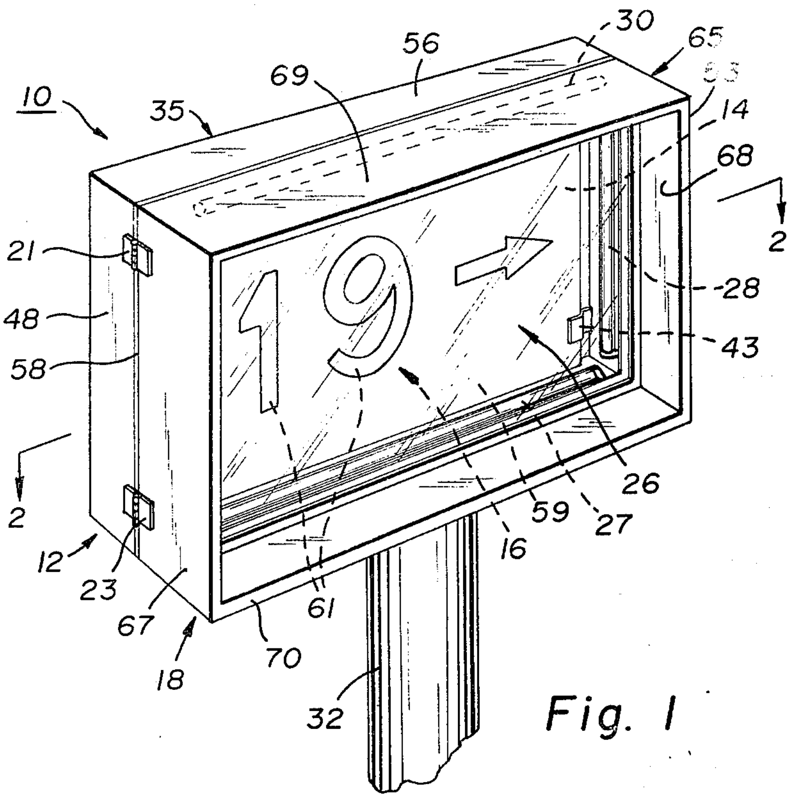
FIG. 1 is a pictorial fragmentary view of a sign constructed in accordance with this invention.
Figure 2:
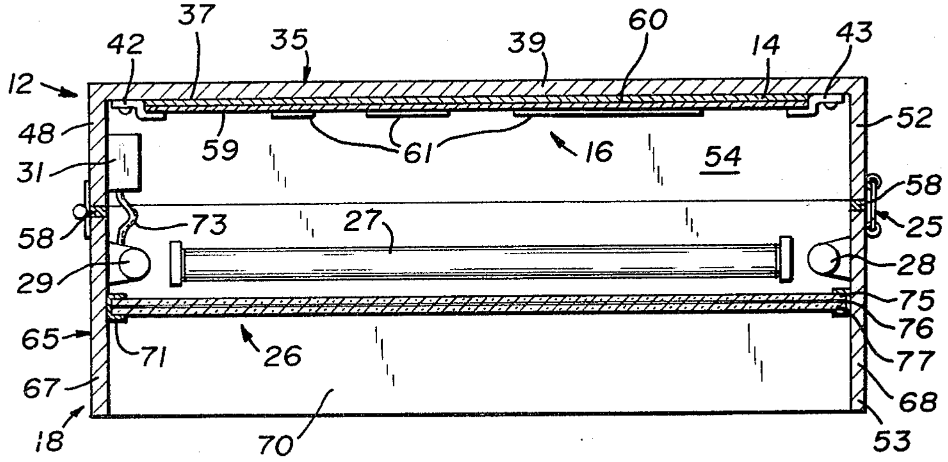
FIG. 2 is a horizontal sectional view of the sign of FIG. 1 taken substantially along the line 2—2 of FIG. 1.

Referring now to the drawings, and more particularly to FIGS. 1 and 2 thereof, there is shown a sign 10 constructed in accordance with the present invention. The sign 10 shown and described herein is a destination taxiway sign, but it will become apparent to those skilled in the art that the sign of the present invention may be employed for other purposes as well.

As best seen in FIG. 2, the sign includes an open box-like support or frame 12, an indicia-bearing substratum or sheet 14 releasably held in the support 12 in position for observation from the front of the sign 10, and daylight fluorescent pigment-containing indicia 16 (FIG. 1) on the sheet 14.

The frame 12 includes a front cover unit 18 which is swingably attached to the support 12 by hinges 21 and 23, and secured in its closed position by means of a latch 25 (FIG. 2). A transparent, ultraviolet-absorbing shield 26 is mounted in the cover unit 18 and is disposed in a spaced-apart relationship in front of the indicia 16 to protect it from ultraviolet radiation, while allowing unobstructed observation thereof. Four ultraviolet lamps 27, 28, 29 and 30 are arranged at the inner periphery of the unit 18 intermediate the indicia 16 and the shield 26.

The lamp 27 is connected to a source of electrical power (not shown) and is controlled by a conventional switch (not shown). The lamps 28, 29 and 30 are used for ultraviolet illumination of the indicia 16.

A mounting standard 32, fixed to the underside of the housing 12 is secured at its bottom end (not shown) to a foundation (not shown) to anchor the sign to the ground and positions the sign 10 for convenient observation thereof.

In use, the sign 10 is mounted at the desired location, in position to be readily observed. Assuming the sign is used outdoors, for example, as a taxiway guidance sign at an airport, the indicia 16 indicates information for a pilot of an aircraft while taxiing to take-off position. During daylight hours, visible solar light impinges on the sign 10, thereby passing through the transparent shield 26 with very little attenuation. The ultraviolet portion of the solar radiation impinging on the sign 10 is absorbed by the shield 26 and thus does not come into contact with the indicia 16. As a result, fading of the indicia 16 is greatly reduced.

The shorter wavelength visible solar radiation causes fluorescence of the fluorescent pigment-containing indicia 16, thereby creating a highly visible image. The indicia 16 is readily seen through the shield 26 by means of both reflected daylight illumination and the fluorescent-induced light emitted by the indicia.

During low light and nighttime conditions, the ultraviolet lamps 27, 28, 29 and 30 are illuminated. The lamp 27 is left on continuously to provide a constant, base level of ultraviolet illumination of the indicia 16. The lamps 28, 29 and 30 are turned on and off alternatingly to provide an attention-attracting flashing effect. The indicia 16 appears to glow more and less strongly. It is preferred that the lamps 28, 29 and 30 be on for longer periods than they are off. The flashing rate is adjusted to give the indicia 16 a subjectively high degree of conspicuity, without causing discomfort to the eyes of the observer, which discomfort can occur when the frequency of flashing on and off is either too high or too low.

Since the lamps are interposed between the indicia 16 and the shield 26, ultraviolet radiation from the lamps impinges directly upon the indicia 16 without passing through, and being absorbed by, the shield 26. The ultraviolet input causes the indicia 16 to fluoresce and emit wavelengths of radiation in the visible range. The indicia appear to glow with a color which is determined by the particular fluorescent pigment formulation they contain. This color is relatively glare-free and is easily seen through the transparent shield 26. Similarly, the ultraviolet lamps 27, 28, 29 and 30 emit little visible light and so produce relatively minor amounts of glare. Thus, the indicia 16 of the sign 10 are visible at night, yet there is present only a minimum amount of the glare which can interfere with the vision of a pilot during the crucial moments prior to takeoff.

Considering now the support 12 in greater detail, with reference to FIGS. 1 and 2, the support 12 includes a shallow box-like structure 35 having one face open. The structure 35 is constructed of any opaque, rigid material, such, for example, as wood, metal or plastic.

As shown in FIG. 2, an inner face 37 of the rear wall 39 has a set of retaining clips, such as the clips 42 and 43, for attaching releasably the corners of the sheet 14 in overlying relationship with the rear wall 39. The clips 42 and 43 releasably hold the sheet 14 to the surface 37, so that the sheet 14 can be replaced or changed, as desired.

The hinges 21 and 23 are attached to a right side wall 48 of the structure 35, and the latch 25 is attached between a left side wall 52 of the structure 35 and a left side wall 53 of the cover unit 18.

The indicia-bearing sheet or substratum 14 is composed of opaque material, such as wood, metal, heavy paper, plastic, or the like. The indicia 16 includes a background coating 59 covering a forward face 60 of the substratum 14, and a set of coatings 61 configured in the shape of desired characters or symbols.

The indicia 16 may be applied to the face 60 of the sheet 14 in the form of coatings, in a conventional manner. It will be apparent also to those skilled in the art that, alternatively, the sheet 14 can be composed of a plastic material, and the indicia 16 can be molded into the body of the sheet 14.

The indicia 16 is composed of conventional compositions pigmented with daylight fluorescent pigments. Typical coating formulations are found, for example, in the *Pigment Handbook,* Vol. II, Temple C. Patton, Ed., John Wiley & Sons, Inc. (1973) at pages 143 ff. Marking compositions suitable for the indicia 16 are disclosed in my U.S. Pat. No. 4,172,063. Daylight fluorescent pigments are commodities of commerce and may be obtained, for example, from Lawter Chemicals, Inc., Northbrook, Illinois. If extremely high daylight visibility is not a requirement, then nondaylight type fluorescent materials are usable in the indicia 16.

The cover unit 18 includes a box-like structure 65 having open front and rear faces and composed of an opaque structurally strong material, such as wood, metal, plastic, or the like. A right side wall 67 and left side wall 68 of the front structure 65 interconnect a top wall 69 and a bottom wall 70.

An elastomeric sealing strip 58 is attached to the outer edges of the walls 48, 52, 54 and 56 of the rear structure 35 and serves to form a weathertight seal between the structure 35 and the mating edges of the corresponding walls of the cover unit 18 when the two are fastened together with the latch member 25.

The shield 26 is mounted by conventional channels, such as channel 71, substantially midway between the front and rear edges of side walls 67 and 69 of the structure 65.

The hinges 21 and 23 are disposed relative to the support 12 and the cover unit 18 to bring the edges of the walls of the support 12 and of the unit 18 into register with one another in the closed position as shown in FIG. 1. The latch 25 urges the edges of the support 12 and cover unit 18 together and to hold securely the support 12 and cover unit 18 together. The elastomeric sealing strip 58 is compressed between the abutting edges of the support 12 and the cover unit 18, and serves to seal the interior of the sign 10 from the weather. The latch 25 can be released and the cover unit 18 swung open to enable access to the interior of the sign 10 for maintenance purposes and for changing the indicia 16.

The lamps 27, 28, 29 and 30 are mounted by conventional means (not shown) along the inner surfaces of the side walls 67 and 68, top wall 69 and bottom wall 70 of the unit 18, are disposed forwardly of the substratum 14, and use conventional associated circuitry (not shown). The lamps are conventional commercial units suitable for causing fluorescence of the indicia 16. The associated circuitry of the lamps 28, 29 and 30 is preferably of the rapid start type to facilitate their use in a flashing mode.

The flasher unit 31 is mounted on a bottom wall 54 of the structure 35 and is connected by conductors, such as the wire 73 connecting the flasher 31 and the lamp 29, to the lamps 28, 29 and 30. The flasher 31 is connected by conventional means to a power source (not shown) and a switch (not shown).

The configuration of the support 12 and the cover unit 18, in conjunction with the disposition of the indicia-bearing sheet 14 recessed toward the rear of the support 12 provides a "shadow box" effect. Thus, the indicia 16 are afforded an additional measure of protection from solar daylight illumination by the shading provided by the opaque top and sides of the support 12 and of the cover unit 18.

The shield 26 is constructed of laminated glass having an inner layer 75 of clear glass laminated to an interlayer 76 composed of a plastic material which absorbs ultraviolet radiation. The layer 76 is, in turn, laminated to an outer layer 77 of clear glass. Suitable such laminated glass material includes an interlayer 76 composed of UV-Absorbing "SAFLEX" material made by the Monsanto Company, St. Louis, Mo. Fabricators of such laminated glass include PPG Industries, Inc., Pittsburgh, Pa. and Libbey-Owens Ford, Toledo, Ohio.

To prepare the sign 10 for use, suitable information-conveying indicia 16 are coated on, or otherwise placed upon or in, the sheet 14 using daylight fluorescent pigments in the coating or other medium. The latch 25 on the support 12 and cover unit 18 disengaged. The cover unit 18 is then swung open on the hinges 23 and 24. If a sheet 14 is in place in the sign 10, it is unclipped from the clips, such as 42 and 43, and removed. The new sheet 14 is then secured in place with the clips, the cover unit is swung shut and latched to the support.

Figure 3:
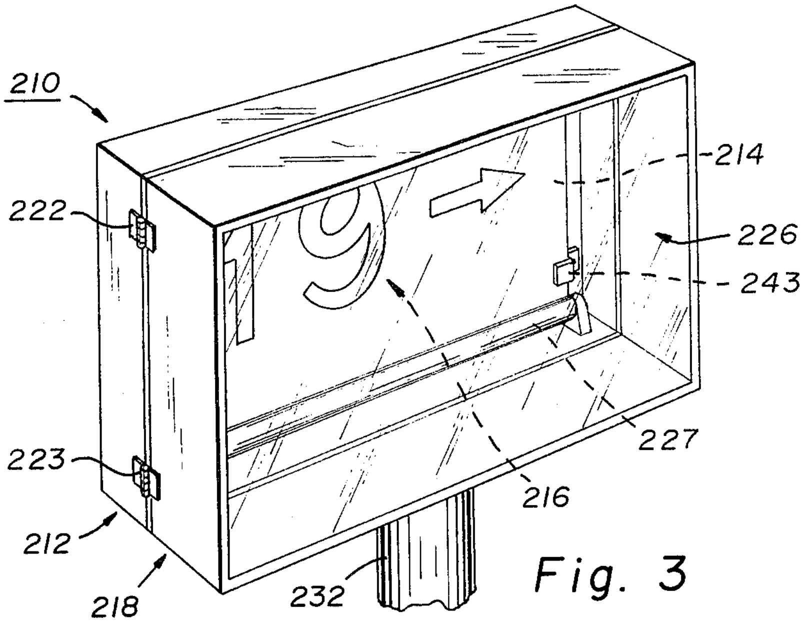
FIG. 3 is a pictorial fragmentary view of another sign constructed in accordance with the present invention.

Referring now to FIG. 3 of the drawings, there is shown a sign 210 which is constructed in accordance with the present invention and which is generally similar to the sign 10.

The sign 210 includes a support 212 for holding an indicia-bearing substratum or sheet 214 in a similar manner as the sign 10. Daylight fluorescent pigment-containing indicia 216 is disposed on the front face of the sheet 214 which is releasably fastened to the support 212 by clips, such as a clip 243. A cover unit 218 is movably attached to the support 212 by a hinge 222 and 223 and is secured to the support unit by a latch (not shown). A mounting standard 232 is fixed to the support 212 by conventional means (not shown).

A transparent, ultraviolet-absorbing shield 226 is mounted in the cover unit 18 and is disposed in front of the indicia 216 to protect them from ultraviolet radiation while allowing ready observation of the indicia. A single ultraviolet lamp 227 is mounted by conventional means (not shown) at the bottom of the support 212 and is disposed intermediate the indicia 216 and the shield 226 for ultraviolet illumination of the indicia 216 and is connected to an electrical supply (not shown) and control switches (not shown).

The sign 210 differs from the sign 10 in that the shield 226 of the sign 210 is mounted adjacent to or flush with the outer face of the cover unit 218. Also, the shield 226 is composed of a structural plastic material, which is substantially transparent to visible light and which is substantially opaque to ultraviolet radiation. Such plastic material is commercially available and may be obtained, for example, from the Rohm and Haas Company, Philadelphia, Pa., sold under the trade name "UV-ABSORBING PLEXIGLAS UF3". This is an acrylic type of plastic material.

Figure 4:
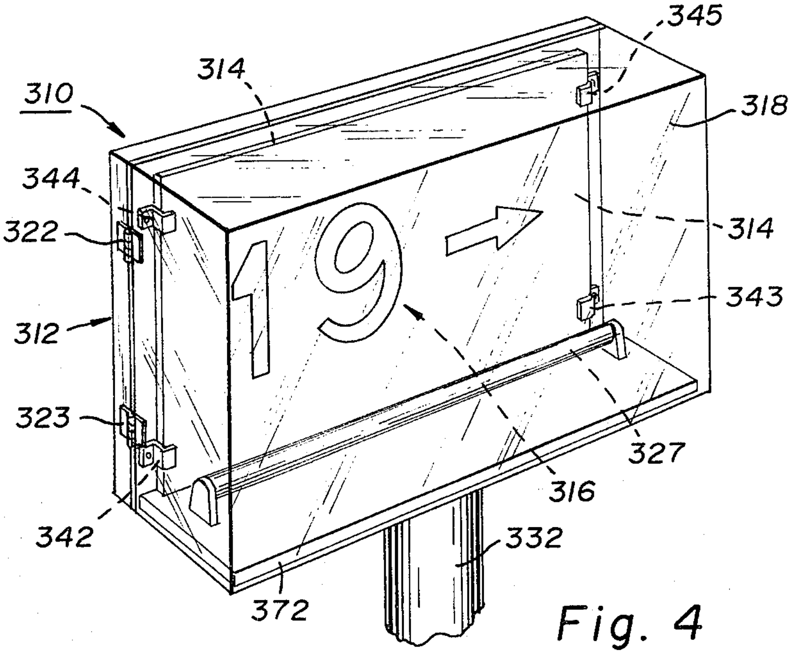
FIG. 4 is a pictorial fragmentary view of still another sign constructed in accordance with the present invention.

Referring now to FIG. 4 of the drawings, there is shown a sign 310, which is constructed in accordance with the present invention and which is generally similar to the sign 10 except that the front cover is entirely transparent for added visibility. The sign 310 includes a support 312, similar to the support 12 of the sign 10, for holding an indicia-bearing substratum or sheet 314. A standard 332, fixed to the support 312 holds the sign 310 for viewing. Daylight fluorescent pigment-containing indicia 316 are disposed on the sheet 314 which is releasably fastened to the support 312 by clips 342, 343, 344 and 345. A cover unit 318 is movably attached to the support 312 by hinges 322 and 323 and is secured to the support 312 by a latch (not shown).

The signs 10 and 210 differ from the sign 310 in that, rather than having a shield mounted in a cover unit, as in the signs 10 and 210, the entire cover unit 318 serves as a shield. While similar in general shape to the cover units 18 and 218, the side and top walls, and the outer face of the cover 318 are of a one piece molded construction and are composed of transparent, ultraviolet-absorbing material, which may be the same material as used for the shield 226. Only the bottom wall 372 thereof is opaque.

An ultraviolet lamp 327 is mounted by conventional means on the bottom wall 372 of the unit 318 intermediate the transparent shield and the indicia 316 for illumination thereof with ultraviolet radiation. The lamp 327 is connected by conventional means to a power source (not shown) and controlled by a switch (not shown).

While the preferred embodiments of the present invention have been illustrated and described, it will be apparent that other changes, modifications and applications may be made within the spirit and scope of the invention. It is intended that all such changes, modifications and applications be included within the scope of the appended claims.

I claim:

1. A sign, comprising:

indicia means containing a fluorescent pigment for rendering said indicia highly visible in daylight ambient conditions;

means at least partially translucent to visible radiation and at least partially opaque to ultraviolet radiation, spaced apart in front of said indicia means for shielding thereof from solar ultraviolet radiation impinging on said indicia means to prevent or at least to retard greatly the fading of said fluorescent pigment in said indicia means during daylight ambient conditions and for permitting the observation thereof by visible radiation in daylight ambient conditions; and radiation means disposed in front of said indicia means and interposed between said shielding means and said indicia means for producing rearwardly directed ultraviolet radiation and for causing said radiation to impinge directly on said indicia means without passing through said shielding means to cause said fluorescent pigment to fluoresce in low light ambient conditions to produce forwardly directed visible radiation passing through said shielding means toward an observer.

2. The sign of claim 1 further including support means, and means for holding releasably said indicia means in overlaying relationship on said support means.

3. The sign of claim 2 further including means for mounting said radiation means intermediate said indicia means and said means for shielding to cause radiation from said radiation means to impinge on said indicia means without passing through said means for shielding.

4. The sign of claim 1, wherein said means for shielding includes a transparent sheet of material containing ultraviolet radiation absorbers.

5. The sign of claim 4, wherein said means for shielding includes laminated glass including a layer of glass and a layer of ultraviolet radiation-absorbing plastic material.

6. The sign of claim 4, wherein said shielding means comprises plastic material containing ultraviolet radiation absorbers.

7. The sign of claim 6, wherein said plastic material is an acrylic material.

8. The sign of claim 5, further including hollow frame means having said radiation means mounted therein, said means for shielding being mounted on the front portion thereof and said indicia means being mounted on the rear thereof, means for sealing said frame in a water-tight manner.

9. The sign of claim 9, wherein said frame means includes closure means for permitting access to the interior of said frame means.

10. The sign of claim 8, further including opaque means disposed at the front portion of said frame means for blocking solar ultraviolet radiation from impinging on said indicia means.

* * * * *